United States Patent [19]

Molina

[11] Patent Number: 4,537,213
[45] Date of Patent: Aug. 27, 1985

[54] DOUBLE FLAPPER CHECK VALVE

[76] Inventor: Domingo F. Molina, 1008 Hickory, Colorado City, Tex. 79512

[21] Appl. No.: 644,616

[22] Filed: Aug. 27, 1984

[51] Int. Cl.³ .............................................. F16K 17/12
[52] U.S. Cl. ................................ 137/269.5; 137/270; 137/493.9; 137/512
[58] Field of Search .................... 137/269.5, 269, 270, 137/493.9, 512, 527

[56] References Cited

U.S. PATENT DOCUMENTS

| | | | |
|---|---|---|---|
| 898,524 | 9/1908 | Northup | 137/269.5 |
| 1,528,703 | 3/1925 | Showers | 137/269.5 |
| 1,821,992 | 9/1931 | Stevens | 137/269.5 |
| 4,033,375 | 7/1977 | Hirsch | 137/493.9 |
| 4,296,772 | 10/1981 | Nilsson | 137/269.5 |

Primary Examiner—Alan Cohan
Attorney, Agent, or Firm—Wendell Coffee

[57] ABSTRACT

A housing is divided into two chambers. A tube connects the two chambers. The end of the tube forms a valve seat on each end. The valve seat in one chamber angles upward and the valve seat in the opposite chamber angles downward. A flapper valve is attached above the top of the valve seat which angles upward, and at the bottom of the valve seat which angles downward. Gravity acting upon the flapper valves will hold one in the open position and the other in the closed position unless it is opened by a flow of fluid. Turning the housing upside down will reverse the position of the flapper valves so that the permitted fluid flow will be reversed.

2 Claims, 4 Drawing Figures

DOUBLE FLAPPER CHECK VALVE

BACKGROUND OF THE INVENTION (1) Field of the Invention

This invention relates to fluid flow, and more particularly to a check valve which permits flow in a first direction with one side up and in the reverse direction with the other side up.

(2) Description of the Prior Art

Check valves having angled valve seats and flapper valves are well known to the art.

In oil field connections, it is customary to have a check valve from a well to a pipeline to prevent flow of fluid from the pipeline back into the well. However, at certain times, it is desirable to have the connection to the valve opened. In such a situation, it is desirable not to have the fluid flowing from the well.

Before this application was filed, the applicant had a search made in the United States Patent and Trademark Office. In that search, the following patents were found:

| | |
|---|---|
| GREAT BRITAIN | 466,335 |
| WHEATLEY | 3,720,225 |
| SUTHERLAND | 4,090,527 |
| EMINGER | 4,141,381 |
| KESSEL | 4,259,983 |
| BOKROS | 4,272,854 |

Applicant does not believe any of these references are pertinent, however Applicant believes the Examiner would be interested in any patent reported by an experienced patent searcher.

SUMMARY OF THE INVENTION (1) New Functions and Surprising Results

This invention has a housing with a tube extending through it and two valve seats, one angled upward and one angled downward. A flapper valve is provided for each. In one position, the fluid will flow in one direction because the downward facing flapper valve will be pulled down by gravity so that it will not close against that valve seat. The other flapper valve will be pushed open by the flow of fluid permitting flow in that direction. If the housing is turned upsidedown, the position of the valves are reversed so that the fluid will flow in the opposite direction.

(2) Objects of this invention

An object of this invention is to permit flow in one direction only if the valve is in one position and to permit flow in the opposite direction only if the valve housing is turned upsidedown.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
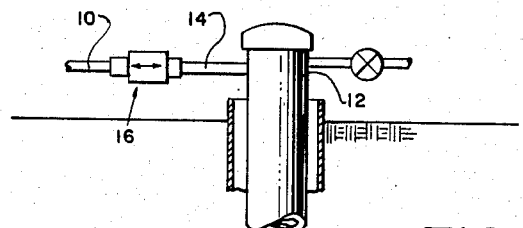
FIG. 1 is a schematic representation of a well and a pipeline connected by a valve of this invention.

Referring to the drawings, and more particularly to FIG. 1, there may be seen a schematic representation of a pipeline 10 connected to a well 12 by a flowline 14. If the flowline 14 is considered to be an extension of the pipeline 10, it may be seen that check valve 16 is within a horizontal pipeline. By horizontal, it is meant that the pipeline will have a horizontal longitudinal axis.

Figure 2:
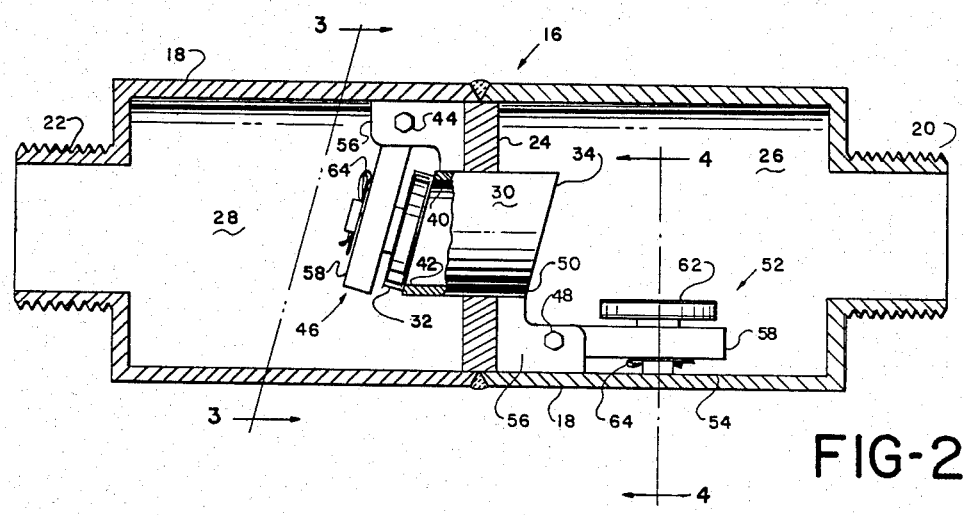
FIG. 2 is a longitudinal sectional view of said valve.
Figure 3:
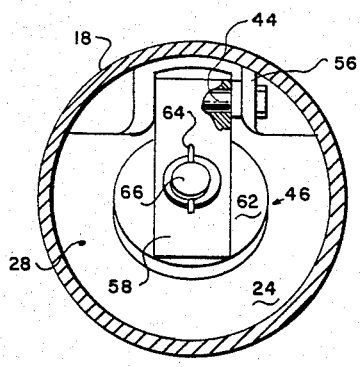
FIG. 3 is a cross sectional view taken substantially on line 3—3 of FIG. 2.
Figure 4:
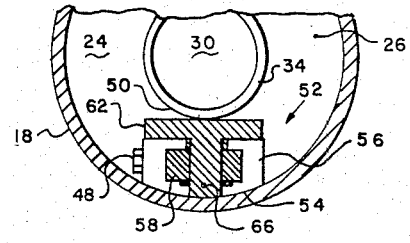
FIG. 4 is a cross sectional view taken substantially on line 4—4 of FIG. 2.

Referring to FIG. 2, the check valve 16 has a housing 18. The housing has a larger diameter than flowline nipple 20 on one end and pipeline nipple 22 on the other end. The housing is connected into the pipeline by the threaded nipples 20 and 22. Divider 24 in the housing divides the housing into two chambers which are designated as upstream chamber 26 and downstream chamber 28. The valve is shown oriented so that there could be a flow from the flowline nipple 20 through the upstream chamber 26 and through the downstream chamber 28 into the pipeline through pipeline nipple 22. As will be explained latter, if the housing is rotated upside down or 180° about the pipeline axis, the upstream chamber will be adjacent to the pipeline 10, and the downstream chamber will be adjacent to the flowline 14.

Tube 30 connects the upstream and downstream chambers 26 and 28. Because the divider 24, separates the chambers, tube 30 is the only fluid connection between the two chambers.

Each of the chambers will have a top and bottom, the top being on the upside and the bottom on the lower side; however, when the housing is turned upside down, these will reverse. Also, it will be seen that the tube is in the direction of the pipeline. I.e., the tube generally extends as being aligned with the flowline nipple 20 and the pipeline nipple 22. I.e., the tube 30 would be coaxial with the pipeline 10. However, it is not necessary that it be exactly so; therefore, the terminology that it extends in the direction of the pipeline axis is used. Downstream valve seat 32 is on the tube 30 in the downstream chamber 28. Upstream valve seat 34 is in the upstream chamber 36. The downstream valve seat 32 has a valve seat top 40 and a valve seat bottom 42. The valve seats 32 and 34 are parallel. The valve seat bottom 42 of the downstream valve seat 32 extends into the downstream chamber 28 further than the valve seat top 40 extends into the downstream chamber 28. Stated otherwise, the valve seat is not vertical, but is angled or slopped so that the valve seat faces upward. I have found that an angle of 75° between the valve seat and horizontal axis of the tube is satisfactory.

Downstream pivot pin 44 extends transversely of the tube 30 in the housing 18 above the top 40 of the downstream valve seat 32. Downstream flapper valve 46 is pivoted on the downstream pivot pin 44. As may be seen, valve 46 is adapted to seat on the valve seat 32. Normally it will be seated on the valve seat because of gravity. Therefore, it may be seen that the downstream flapper valve 46 prevents fluid flow from the downstream chamber 28 through the tube 30 to the upstream chamber 26.

The downstream chamber 28 and the upstream chamber 26 are of similar shape and arrangement. Also, all of the elements or contents within the chamber; i.e., the valve seat, flapper valve, and hinge pin are of similar shape and arrangement. However, one is upside down relative to the other. I.e., upstream pivot pin 48 extends transversely of the tube 30 below the bottom 50 of the upstream valve seat 34. Upstream flapper valve 52 on the upstream pivot pin 48 will lie upon the housing bottom 54 of the upstream chamber 26. I prefer that the housing be cylindrical and coaxial with the tube 30. Since the housing is larger in diameter than the tube 30, the upstream flapper valve 52 will lie on housing bottom 54 so that the flapper valve is below bottom 50 of tube 30. The bottom 50 of the tube 30 is also the bottom of the valve seat 34. The valve 52 will also lie below the bottom of the flowline nipple 20. Therefore, any flow of fluid entering the chamber will not tend to push the upstream flapper valve against the valve seat but will permit the gravity to hold it on the bottom 54 of the housing.

The nipples 20 and 22 of the housing are threaded to mate with the ends of the pipeline 10 and flowline 14. Therefore, the housing may be rotated upside down about the pipeline axis. By upside down, it is meant a 180° rotation. After this rotation, the top becomes the bottom and the upstream chamber is reversed and becomes the downstream chamber and the downstream chamber becomes the upstream chamber. In the new position, flow may flow from the pipeline 10 and the pipeline nipple 22 through the chambers and out of the flowline nipple 20. However, flow is prevented from the flowline to the pipeline nipple.

Therefore, it may be seen that I have provided a check valve which may be reversed. The direction in which the flow is permitted and is prohibited is reversed according to which side is up.

The divider 24 is part of the housing 18, and therefore, ears 56 on the divider which provide for the reception of the pivot pins 44 and 48 are a part of the housing structure. Each flapper valve includes flapper holder 58 which has a hole therethrough which encircles the pivot pin. Stud 66 on the back of valve disc 62 extends through a hole in the holder 58. The disc 62 is held in place by cotter 64 which extends diagonally through the stud 66. The arrangement is clearly shown in the drawings.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific examples above do not point out what an infringement of this patent would be, but are to enable the reader to make and use the invention.

As an aid to correlating the terms of the claims to the exemplary drawing, the following catalog of elements is provided:

| | |
|---|---|
| 10 Pipeline | 40 Valve Seat Top |
| 12 Eduction Tube | 42 Valve Seat Bottom |
| 14 Flowline | 44 Downstream Pivot Pin |
| 16 Check Valve | 46 Downstream Flapper Valve |
| 18 Housing | 48 Upstream Pivot Pin |
| 20 Flowline Nipple | 50 Bottom of Valve Seat |
| 22 Pipeline Nipple | 52 Upstream Flapper Valve |
| 24 Divider | 54 Bottom |
| 26 Upstream Chamber | 56 Ears |
| 28 Downstream Chamber | 58 Holder |
| 30 Tube | 62 Disc |
| 32 Downstream Valve Seat | 64 Cotter |
| 34 Upstream Valve Seat | 66 Stud |

I claim as my invention:

1. A reversible check valve for a pipeline having a horizontal longitudinal axis comprising:
   a. a housing divided into
   b. an upstream chamber and
   c. a downstream chamber,
   d. each chamber having a top and bottom,
   e. a horizontal tube connecting the chambers,
   f. said tube extending in the direction of the pipeline axis,
   g. a valve seat on the tube in each of the chambers,
   h. each valve seat having a top and bottom,
   i. the valve seats being parallel,
   j. the bottom of the downstream valve seat extending into the downstream chamber further than the top,
   k. a downstream pivot pin extending transversely of the tube in the housing above the top of the downstream valve seat,
   l. a downstream flapper valve on the downstream pivot pin adapted to seat on the valve seat,
   m. so that the downstream flapper valve prevents fluid flow from the downstream chamber to the upstream chamber,
   n. an upstream pivot pin extending transversely of the tube in the housing below the bottom of the upstream valve seat,
   o. an upstream flapper valve on the upstream pivot pin adapted to lie on the bottom of the chamber below the bottom of the upstream valve seat,
   p. the chambers and their contents of similar shape and arrangement, and
   q. means for connecting the housing in the pipeline for rotating the housing upsidedown about the pipeline axis so that the top becomes the bottom and upstream becomes downstream.

2. The invention as defined in claim 1 with the addition of:
   r. a well,
   s. a flowline,
   t. a pipeline, and
   u. said means for connecting including nipples on the housing which are threaded to the flowline and pipeline so that the housing may be rotated as defined above.

* * * * *